United States Patent [19]
Belart et al.

[11] Patent Number: 4,831,826
[45] Date of Patent: May 23, 1989

[54] HYDRAULIC BRAKE SYSTEM

[75] Inventors: Juan Belart, Walldorf; Werner Volkmar, Walsdorf; Bernd Schuett, Oberursel; Peter Stalheber, Wiesbaden, all of Fed. Rep. of Germany

[73] Assignee: Alfred Teves GmbH, Frankfurt am Main, Fed. Rep. of Germany

[21] Appl. No.: 624,604

[22] Filed: Jun. 26, 1984

[30] Foreign Application Priority Data

Jul. 8, 1983 [DE] Fed. Rep. of Germany ....... 3324631

[51] Int. Cl.$^4$ .............................................. F15B 7/00
[52] U.S. Cl. ...................................... 60/545; 60/418; 60/431; 60/547.1; 303/10; 303/11
[58] Field of Search ...................... 60/547.1, 545, 582, 60/413, 418, 431; 303/10, 11, 84.2, 59, 116, 114, 113

[56] References Cited

U.S. PATENT DOCUMENTS

| | | | |
|---|---|---|---|
| 2,945,352 | 7/1960 | Stelzer | 60/582 |
| 3,712,057 | 1/1973 | Aiki | 60/547.1 |
| 3,799,300 | 3/1974 | Cochrane | 60/418 |
| 4,242,867 | 1/1981 | Belart | 60/413 |
| 4,402,554 | 9/1983 | Belart | 303/116 X |
| 4,421,361 | 12/1983 | Arikawa et al. | 303/116 X |
| 4,477,125 | 10/1984 | Belart | 60/582 |
| 4,490,977 | 1/1985 | Fulmer | 60/547.1 |

FOREIGN PATENT DOCUMENTS

| | | | |
|---|---|---|---|
| 2438469 | 10/1975 | Fed. Rep. of Germany | 60/582 |
| 2527928 | 1/1976 | Fed. Rep. of Germany | . |
| 2462525 | 6/1977 | Fed. Rep. of Germany | . |
| 2162600 | 7/1973 | France | . |

*Primary Examiner*—Edward K. Look
*Attorney, Agent, or Firm*—James B. Raden

[57] ABSTRACT

A hydraulic motor vehicle brake system with a master cylinder (61) and a hydraulic power booster (24) connected upstream of the master cylinder (61), in which a pressure medium pump (1) which may be driven by an electric motor is used for providing an auxiliary hydraulic energy. The drive of the pressure medium pump (1) may be switched on by a pressure accumulator (26) which in the unbraked operation of the automotive vehicle is permanently kept on a pressure level sufficient for an initial actuation of the brake. The pressure accumulator (26) is charged by means of a pressure control valve (7) in which a valve passage (15, 17) is operable by a hydraulic pressure in the booster chamber (23) of the power booster (24) such as to ensure that upon pressurization of the booster chamber (23) a connection will be locked between the pressure accumulator (26) and the power booster (24). The power booster (24) has a pedal-operable throttle valve, with the throttle valve being a double seat valve which in the brake's release position will lock a connection from the pump (1) to the booster chamber (23).

6 Claims, 1 Drawing Sheet

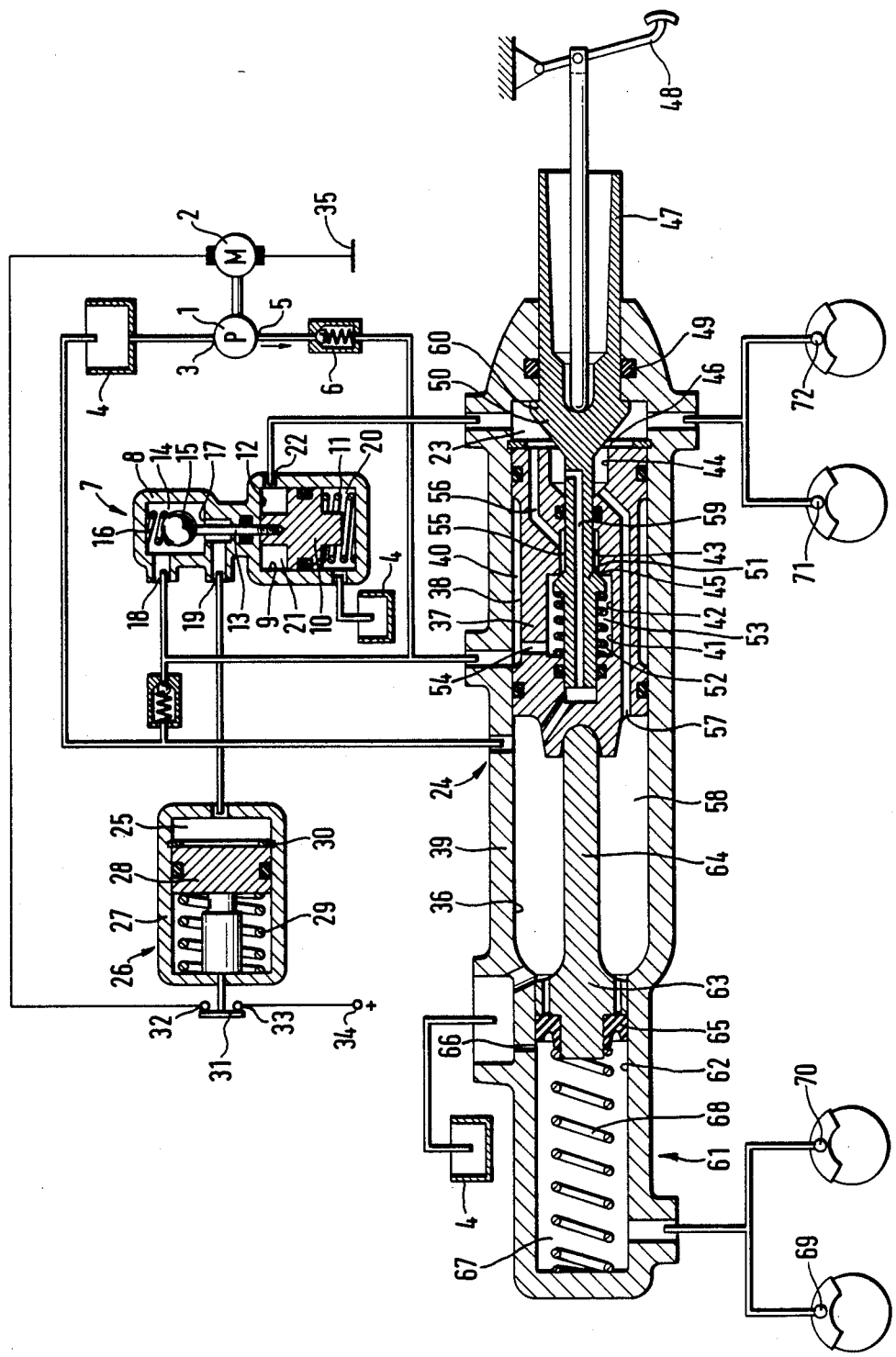

HYDRAULIC BRAKE SYSTEM

BACKGROUND OF THE INVENTION

This invention relates to a hydraulic brake system for automotive vehicles with a master cylinder and with a hydraulic power booster connected upstream of the master cylinder, in which a pressure medium pump which may be driven by an electric motor is used for providing an auxiliary hydraulic energy the drive of which may be switched on by a pressure accumulator which in the unbraked operation of the automotive vehicle is permanently kept on a pressure level sufficient for an initial actuation of the brake and which is charged via a pressure control valve in which a valve passage is operable by a hydraulic pressure in the booster chamber of the power booster such as to ensure that upon pressurization of the booster chamber a connection is locked between the pressure accumulator and the power booster, according to patent (patent application No. P 33 15 731.6).

The subject matter of the aforementioned German patent application is a hydraulic brake system where a pressure medium pump is provided which may be driven by an electric motor. The drive of said pump may be switched on by a brake pedal contact just as well as it may be operated in dependence on the charge of a pressure accumulator. In the unbraked operation of the automotive vehicle the pressure medium pump will be running until a predeterminable charge will have been established in a hydraulic pressure accumulator which will provide a sufficient auxiliary hydraulic energy in the initial phase of braking. This charge having been established, the drive of the pressure medium pump will be switched off.

The pressure accumulator will be charged via a pressure control valve which, on the one hand, has a free hydraulic connection between the pressure port of the pressure medium pump and the inlet of the hydraulic power booster and which, on the other hand, disposes over a valve passage which may be closed by a hydraulic pressure in the pressure chamber of the power booster. Said valve passage is normally open and will come into a closing position as soon as, upon an actuation of the brake, a hydraulic pressure will enter the pressure chamber of the power booster.

In the initial phase of braking the pressure medium pump will start operating when the electric brake pedal contact closes. Due to the inertia of the pressure medium pump, however, there will not be available the full delivery pressure immediately after the start of the pressure medium pump. In this phase the pressure accumulator will be discharged towards the hydraulic power booster via the still open valve passage of the pressure control valve. Thus, a sufficient auxiliary hydraulic energy will also be available in the initial operating phase of the pressure medium pump.

The pressure in the pressure chamber of the hydraulic power booster having reached a predeterminable level, the valve passage of the pressure control valve will come into a closing position in which a connection will be interrupted between the delivery side of the pressure medium pump and the inlet of the pressure accumulator. Thus, the volume delivered by the pressure medium pump will exclusively be supplied to the inlet of the hydraulic power booster. In this operating condition, it will be prevented that the pressure accumulator will be charged anew by the pressure medium pump.

In the described brake system it is necessary that the pressure port of the hydraulic power booster be locked in the unbraked operation and that the booster chamber hydraulically communicate with an unpressurized supply reservoir so as to prevent any pressure from becoming effective at the control port of the pressure control valve. This is generally the case in hydraulic power boosters with a so-called closed center. In certain applications, however, it may be advantageous to use a hydraulic power booster with a so-called open center (throttle-type booster). In the non-operating condition, however, such power boosters will have a free passage from the pressure port to the booster chamber. Upon the actuation of the brake a volume stream supplied by a circulation pump will be throttled in accordance with the actuating force so that there will result a corresponding hydraulic pressure in the pressure chamber. The idea forming the basis of the brake system according to patent application No. P 33 15 731.6 thus cannot be applied directly to such brake systems with throttle-type boosters.

It is thus an object of the present invention to provide a hydraulic brake system of the type referred to above in which a throttle-type booster is used as hydraulic power booster.

SUMMARY OF THE INVENTION

According to this invention, this object is solved in that the power booster has a pedal-operable throttle valve, with the throttle valve being a double seat valve which in the brake's release position locks a connection from the pump to the booster chamber. In such an embodiment hence there will be the advantageous result that the pressure port of the hydraulic throttle-type booster is locked in the brake's release position. Thus in the brake's release position, a hydraulic pressure may build up in the pressure accumulator via the pressure control valve. A structurally simple and advantageous embodiment will be achieved if the booster piston has two valve seats by means of which the throttle valve is formed in cooperation with a piston rod guided in the booster piston and having two throttling members formed fast with the piston rod. To this end, the booster piston has a coaxial bore with essentially three bore sections, with the middle bore section having the smallest diameter. The transistion from the pedal-remote larger bore section to the middle bore section is designed as a valve seat against which the pedal-remote throttling member of the piston rod is resiliently pre-stressed.

In an advantageous further embodiment of the present invention it is further provided that the pedal-operable piston rod, together with the smaller diameter bore section, forms an annular chamber sealed in respect of the booster chamber and having a permanent connection to the booster chamber of the hydraulic power booster. In the operation of the power booster thus pressure medium will flow into the booster chamber after the opening of the pedal-remote valve passage of the power booster. For the time being, said pressure medium, however, will flow off to the return line, unhindered. It is further provided that in the brake's release position the booster piston may be supported at a pedal-close housing abutment. In the brake's release position, thus, a defined relative position of the moving parts of the hydraulic power booster will be established in a simple manner.

It will further be advantageous if the end of the pedal-close bore section of the booster piston forms a valve seat which forms a throttle valve, together with the pedal-close throttling member of the piston rod. Upon the actuation of the brake, pressure medium will be supplied into the booster chamber after the opening of the pedal-remote valve passage. For the time being, said pressure medium will remain unpressurized. The actuation of the brake continuing, the pedal-close throttling member of the piston rod will move towards the end of the pedal-close bore section of the booster piston until finally a throttling gap will be formed which will present a certain resistance to the pressure medium flowing through the booster chamber, thus finally a certain circulating pressure forming in the booster chamber. In an expedient embodiment of the hydraulic power booster it is further provided that the pedal-operable piston rod, together with the pedal-close bore section, forms a circumferential annular chamber which permanently communicates with the unpressurized supply reservoir.

BRIEF DESCRIPTION OF THE DRAWING

One embodiment of this invention will be explained in more detail in the following, reference being made to a sectional view represented in the single FIGURE of the drawing.

DETAILED DESCRIPTION OF THE DRAWING

Reference numeral 1 marks a pressure medium pump which may be driven by an electric motor 2. The suction side 3 of the pressure medium pump 1 is communicating with an unpressurized supply reservoir 4 while the delivery side 5 communicates with a pressure control valve 7 via a check valve 6 closing in the direction of the pressure medium pump and via corresponding pressure lines.

The pressure control valve 7 has a housing 8 wherein a cylinder bore 9 is provided. In the cylinder bore 9 of the pressure control valve 7, a piston 10 is displaceably arranged. In the brake's release position discernible from the drawing a compression spring 11 is prestressing said piston 10 against a wall 12 where the piston 10 abuts. Rigidly connected with the piston 10 of the pressure control valve 7 is a tappet 13. Said tappet 13 is passed into a valve chamber 14 in a sealed manner. In the illustrated brake's release position, the upper end of the tappet 13 as seen in the drawing abuts at a valve ball 15. A compression spring 16 counteracting the compression spring 11 keeps the valve ball 15 abutted at the tappet 13. In such an axial position of the piston 10 or of the tappet 13, respectively, the valve ball 15 is lifted off from a valve seat 17, thus a hydraulic communication being established between housing ports 18, 19 of the pressure control valve. The compression spring 11 of the pressure control valve 7 is arranged in a chamber 20 permanently communicating with the unpressurized supply reservoir 4. The front face of the piston 10 which is averted from chamber 20 confines a control chamber 21. Via a housing port 22, said control chamber 21 communicates with the pressure chamber 23 of a hydraulic power booster 24. The housing port 18 of the pressure control valve is communicating with the delivery side 5 of the pressure medium pump 1 via the check valve 6 while the housing port 19 hydraulically communicates with an inlet chamber 25 of a pressure accumulator 26.

The pressure accumulator 26 substantially comprises a cylindrical housing 27 wherein a piston 28 is guided in an axially displaceable and in a sealed manner. A compression spring 29 prestresses the piston 28 against a housing abutment 30. Thus the volume of the inlet chamber 25 will be at its minimum in the discharged condition of the pressure accumulator 26. A contact piece 31 is mounted at the end of the piston 28 of the pressure accumulator 26 which is averted from the inlet chamber. Said contact piece 31 is passed out of the housing 27 and may be caused to abut at electrical contacts 32, 33. The contact piece 31 and the electrical contacts 32, 33 form an electrical break contact normally closed and establishing an electrical connection between the positive pole 34 and the electric motor 2. Said electric motor 2 is permanently connected with the ground 35. Upon a predeterminable hydraulic pressure in the inlet chamber 25 of the pressure accumulator 26 a displacement of the piston 28 will cause the contact piece 31 to lift off from the electrical contacts 32, 33. Thus the electric motor will be put out of operation.

The hydraulic power booster 24 has a cylinder bore 36 wherein a booster piston 37 is guided in a sealed manner. The booster piston has a circumferential groove 38 which, together with the housing 39 of the hydraulic power booster 24, encloses a circumferential annular chamber 40 communicating with the delivery side 5 of the pressure medium pump and with the housing port 18 of the pressure control valve. Provided in the booster piston 37 is an axial bore 41 having three bore sections 42, 43, 44. The middle bore section 43 has a small diameter as compared with the bore sections 42, 44. The transition from bore section 42 to bore section 43 is designed as valve seat 45. The end of the bore section 44 leading into the pressure chamber 23 likewise forms a valve seat 46. Further, a piston rod 47 protrudes into the pressure chamber 23. Said piston rod 47 is displaceable by means of a brake pedal 48. An annular seal 49 surrounds the piston rod 47 and prevents pressure medium from leaking out of the pressure chamber 23. Formed fast with the piston rod 47 is a pedal-close throttling member 50 which in cooperation with the valve seat 46 forms a throttle valve. Further, the piston rod 47 has a pedal-remote throttling member 51 forming a valve passage, together with the valve seat 45. A compression spring 52 prestresses the piston rod 47 in the brake's release direction. The chamber 53 accommodating the compression spring 52 communicates with the circumferential annular chamber 40 via a radial bore 54.

Between the bore section 43 of the axial bore 41 and a section of the piston rod 47, a circumferential annular chamber 55 is formed which directly communicates with the pressure chamber 23 of the hydraulic power booster 24 via a pressure medium channel 56. A further pressure medium channel 57 ends in bore section 44, providing a permanent hydraulic communication between said bore section 44 and a supply chamber 58 communicating with the unpressurized supply reservoir 4. A further pressure medium channel 59 is provided in the piston rod 47. Said pressure medium channel 59 likewise establishes a communication between the bore section 44 and the supply chamber 58. Moreover, the piston rod 47 has an annular collar 60 which in the brake's release position discernible from the drawing abuts the housing 39 of the hydraulic power booster 24 and limits the brake's release movement of the piston rod 47.

Downstream of the hydraulic power booster 24 a master cylinder 61 is connected which has a cylinder bore 62 wherein a master cylinder piston 63 is guided, sealed by gaskets. The master cylinder piston 63 mechanically abuts at the booster piston 37 via an extension 64. An expansion bore 66 is provided at the master cylinder 61 in the direction of actuation in front of the gasket 65. The master cylinder piston 63 confines a working chamber 67 wherein a return spring 68 is arranged. The working chamber 67 of the master cylinder 61 is connected with wheel brakes 69, 70 preferably arranged at the front axle of a automotive vehicle, while wheel brakes 71, 72 are connected to the pressure chamber 23 of the hydraulic power booster 24. Said wheel brakes 71, 72 are preferably arranged at the rear axle of the automotive vehicle.

In the following, the mode of operation of the described brake system will be explained in more detail, starting from the brake's release position in which all the moving parts will have adopted the positions descernible from the drawing. It further be assumed that the inlet chamber 25 of the pressure accumulator 26 will be unpressurized as may be the case after a prolonged time of standstill of the vehicle. When starting the automotive vehicle, the positive pole 34 will be connected with the electrical contact 33 via a non-represented ignition contact. As the pressure accumulator 26 is discharged the contact piece 31 will establish a connection to contact 32, thus the electric motor 2 starting. The pressure medium pump 1 coupled with the electric motor 2 now will deliver pressure medium to the pressure accumulator 26 via the check valve 6 and the open valve passage 17, 15 of the pressure control valve 7. Thus a hydraulic pressure will build up in the inlet chamber 25. Said hydraulic pressure will finally displace the piston 28 against the force of the commpression spring 29 until the contact piece 31 will lift off from the electrical contacts 32, 33 and switch off the electric motor 2. At this moment the pressure accumulator 26 will have received a fluid volume which will be sufficient for an initial actuation of the hydraulic power booster 24 and which will be pressurized by a pressure of e.g. 40 bar.

If now an actuating force is exerted on the brake pedal 48, at first the valve passage 51, 45 will open. Thus pressure medium will flow from the circumferential annular chamber 40 into the circumferential annular chamber 55. Thence, it will reach the booster chamber 23 of the hydraulic power booster 24 via the pressure medium channel 56. In this phase, the volume delivered to the pressure chamber 23 will be taken from the inlet chamber 25 of the pressure accumulator 26 which will be discharged into the circumferential annular chamber 40 via the still open valve passage 15, 17.

Upon an increase of the actuating force exerted on the brake pedal 48, the valve passage 46, 50 will come into a throttling position, thus in the pressure chamber 23 a hydraulic pressure forming which will finally displace the booster piston 37 in the direction of actuation and which, moreover, will ensure that the piston 10 of the pressure control valve 7 will be displaced against the force of the compression spring 11. Thus the valve ball 15 will come to abut on the seat 17, a hydraulic communication being interrupted between the delivery side 5 of the pressure medium pump 1 and the inlet chamber 25. After the wheel brakes 71, 72 had dynamically been pressurized by the pressure accumulator 26 in the initial phase of braking, a corresponding pressure having built up in respectively the working chamber of the master cylinder 61 and in the wheel brakes 69, 70, the auxiliary hydraulic energy needed upon a continued actuation of the brake will exclusively be delivered by the pressure medium pump 1 which subsequently will be in permanent operation due to the closed break contact 31, 32, 33.

When releasing the brake, the described operations will be reversed until finally the brake's release position discernible from the drawing will have been reestablished. As the break contact 31, 32, 33 is closed, the electric motor 2, however, will continue to operate for the time being. Thus the pressure medium pump will continue to run, with the valve passage 45, 51 being closed, until the pressure accumulator 26 will have reached the predetermined pressure of approximately 40 bar.

What is claimed is:

1. A hydraulic brake system having a plurality of wheel brakes for automotive vehicles, comprising:

a master cylinder, a hydraulic power booster, and a driven hydraulic pressure pump hydraulically connected to pressurize a pressure accumulator, said pressure pump being energized upon said pressure accumulator achieving less than a predetermined volume of hydraulic fluid, said pressure pump being deenergized upon said pressure accumulator achieving a predetermined volume of hydraulic fluid;

said hydraulic connection between said pressure pump and said pressure accumulator including a normally open pressure control valve;

said brake system further including a throttle valve, said throttle valve controlling said pressure control valve, said throttle valve being in a first position when said brake system is unactuated, whereby said first position of said throttle valve provides that said pressure control valve is normally open, said throttle valve being in a second position when said brake system is actuated, whereby said second position of said throttle valve provides that said pressure control valve closes, whereby the closing of said pressure control valve provides that said pressure pump directly supplies pressurized hydraulic fluid to at least one of said wheel brakes.

2. A hydraulic brake system as recited in claim 1, wherein the throttle member includes first and second valve seats and first and second respective valve members, wherein said first valve seat is closed and said second valve seat is open when said brake system is unactuated and said first valve seat is open and said second valve seat is closed when said brake system is actuated.

3. A hydraulic brake system as recited in claim 2 wherein the throttle valve is provided by a throttle member located in said power booster, said throttle member being located within a bore, said bore being located within a power booster piston.

4. A hydraulic brake system as recited in claim 3 wherein the booster piston bore has a first, a middle and a third coaxial bore section and wherein said middle bore section has a smaller diameter than either said first and third bore section.

5. A hydraulic brake system as recited in claim 4 wherein the booster piston bore has a step between said first and middle bore sections and a step between said middle and third bore sections wherein said steps respectively provide said first and second valve seats.

6. A hydraulic brake system as recited in claim 4 wherein said first and second valve members are provided by a pedal operable throttling member located within said booster piston bore, said throttling member being biased in an unactuated position.

* * * * *

UNITED STATES PATENT AND TRADEMARK OFFICE
CERTIFICATE OF CORRECTION

PATENT NO. : 4,831,826

DATED : May 23, 1989

INVENTOR(S) : Juan Belart

It is certified that error appears in the above-identified patent and that said Letters Patent is hereby corrected as shown below:

On the Title Page, Item [19] "Belart et al." should read

-- Belart --.

Item [75] "Juan Belart, Walldorf; Werner Volkmar, Walsdorf; Bernd Schuett, Oberursel; Peter Stalheber, Wiesbaden, all of Fed. Rep. of Germany" should read -- [75] Juan Belart, Walldorf, Fed. Rep. of Germany --.

Signed and Sealed this

Seventh Day of November, 1989

*Attest:*

JEFFREY M. SAMUELS

*Attesting Officer*     *Acting Commissioner of Patents and Trademarks*

UNITED STATES PATENT AND TRADEMARK OFFICE
CERTIFICATE OF CORRECTION

PATENT NO. : 4,831,826
DATED : May 23, 1989
INVENTOR(S) : Juan Belart

It is certified that error appears in the above—identified patent and that said Letters Patent is hereby corrected as shown below:

On the Title Page, Item [73] "Alfred Teves GmbH, Frankfurt am Main, Fed. Rep. of Germany" should read --ITT Industries, Inc., New York, N.Y.--.

Item [30] "Jul. 8, 1983 [DE] Fed. Rep. of Germany....
...3324631" should read
--[30] Jun. 30, 1983 [DE] Fed. Rep. of Germany....
...3323500--.

Signed and Sealed this

Nineteenth Day of March, 1991

Attest:

HARRY F. MANBECK, JR.

*Attesting Officer*     *Commissioner of Patents and Trademarks*